United States Patent
Takahashi et al.

(10) Patent No.: US 9,196,186 B2
(45) Date of Patent: Nov. 24, 2015

(54) DISPLAY DEVICE AND METHOD FOR DRIVING DISPLAY DEVICE

(75) Inventors: Kazuki Takahashi, Osaka (JP); Masaki Uehata, Osaka (JP); Kohji Saitoh, Osaka (JP); Masami Ozaki, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 14/009,619

(22) PCT Filed: Apr. 4, 2012

(86) PCT No.: PCT/JP2012/059260
§ 371 (c)(1),
(2), (4) Date: Oct. 3, 2013

(87) PCT Pub. No.: WO2012/137849
PCT Pub. Date: Oct. 11, 2012

(65) Prior Publication Data
US 2014/0028655 A1    Jan. 30, 2014

(30) Foreign Application Priority Data

Apr. 8, 2011  (JP) .................................. 2011-086818

(51) Int. Cl.
*G09G 3/36* (2006.01)
*G09G 3/20* (2006.01)
(Continued)

(52) U.S. Cl.
CPC .............. *G09G 3/20* (2013.01); *G09G 3/3291* (2013.01); *G09G 3/3685* (2013.01);
(Continued)

(58) Field of Classification Search
CPC ........... G09G 3/3685; G09G 2320/00; G09G 2320/106; G09G 2310/0251; G09G 2310/06; G09G 3/3688; G09G 2300/0861; G09G 2310/027; G09G 2330/021; G09G 3/2011; G09G 3/3233; G09G 3/3614; G09G 2300/0852; G09G 2310/0289; G09G 2330/02; G09G 2360/16; G06F 1/3203; G06F 11/0754; G06F 11/1415; G06F 12/0891; G06F 1/24; G06F 1/30; G06F 1/3209; G06F 1/3237; G06F 1/3296; G06F 11/0757
USPC ........... 345/76–84, 87, 98, 99, 100, 690, 204, 345/211
See application file for complete search history.

(56) References Cited

U.S. PATENT DOCUMENTS 7,154,491 B2 * 12/2006 Iwasaki ......................... 345/204
7,209,132 B2 *  4/2007 Kida et al. .................... 345/211
(Continued)

FOREIGN PATENT DOCUMENTS

JP       2004-208303 A    7/2004

OTHER PUBLICATIONS

Appliant Admitted Prior art (AAPA): specification pp. 1-5 and Fig. 8.*
Official Communication issued in International Patent Application No. PCT/JP2012/059260, mailed on May 15, 2012.

*Primary Examiner* — Duc Dinh
(74) *Attorney, Agent, or Firm* — Keating & Bennett, LLP

(57) ABSTRACT

A display device (10) includes a timing control section (13) and a signal line drive circuit (16), either of which receives a lower power supply voltage level than the other, and a level changing circuit (20) for changing an amplitude level (T) of a reset signal (B). The timing control section (13) and the level changing circuit (20) receive the reset signal (B). The level changing circuit (20) changes the amplitude level (T) of the supplied reset signal (B) and then supply, to the signal line drive circuit (16), a reset signal (Ba) with a converted amplitude level. This makes it possible to achieve an image display with low power consumption and a stable display quality.

13 Claims, 8 Drawing Sheets

(51) Int. Cl.
*G09G 3/32* (2006.01)
*H04N 1/00* (2006.01)

(52) U.S. Cl.
CPC ........... *G09G 3/3688* (2013.01); *G09G 3/3696* (2013.01); *H04N 1/00917* (2013.01); *G09G 2310/0245* (2013.01); *G09G 2310/061* (2013.01); *G09G 2310/062* (2013.01); *G09G 2310/063* (2013.01)

(56) References Cited

U.S. PATENT DOCUMENTS

| | | |
|---|---|---|
| 7,256,778 B1 | 8/2007 | Choi |
| 7,429,971 B2 * | 9/2008 | Park .................... 345/89 |
| 8,669,974 B2 * | 3/2014 | Yang et al. .................... 345/213 |

* cited by examiner

F I G. 7
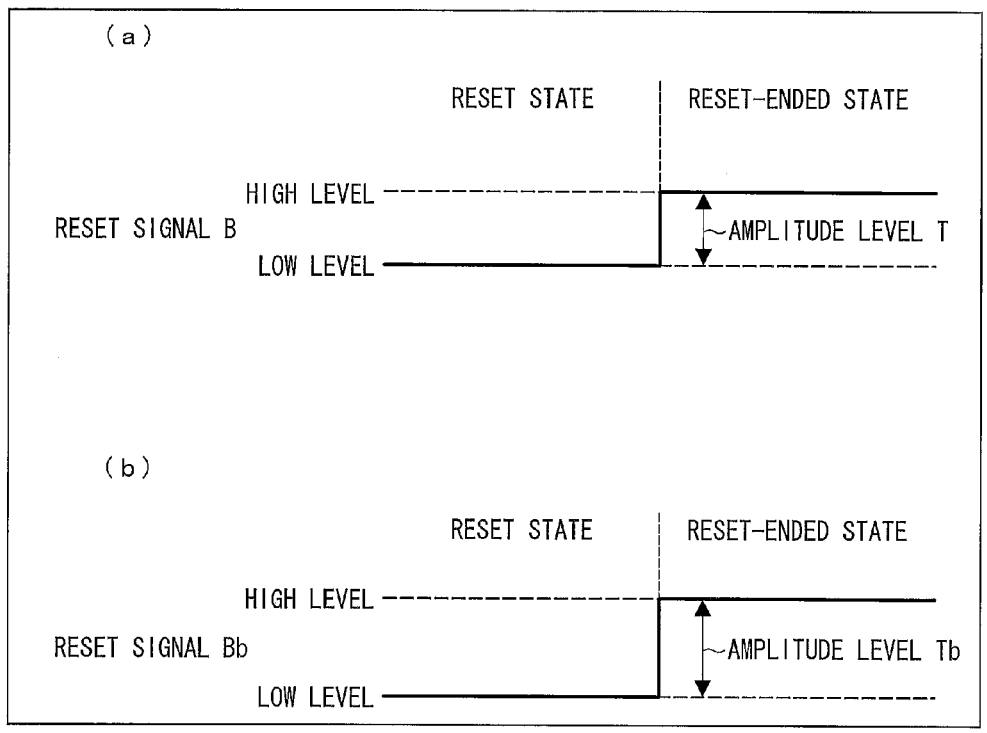

DISPLAY DEVICE AND METHOD FOR DRIVING DISPLAY DEVICE

TECHNICAL FIELD

The present invention relates to a display device and a method for driving the display device.

BACKGROUND ART

Display devices for displaying images such as a liquid crystal display device have been in practical use.

For example, such display devices generally include, as described in Patent Literature 1, a display panel having an image display region, and a timing control section for supplying various drive signals necessary to drive the display panel.

FIG. 8 is a block diagram schematically illustrating a configuration of a conventional display system. As shown in FIG. 8, a display system 100 includes a display device 110 and a system main unit 102.

The system main unit 102 includes a control section 103 for supplying various signals to the display device 110. The display device 110 includes (a) a display panel 112, (b) a signal line drive circuit 116 including signal line drive circuits 116a and 116b, and (c) a timing control section 113.

The signal line drive circuits 116a and 116b are connected with data signal lines (source signal lines) of the display panel 112. The data signal lines are arranged so as to intersect with scanning signal lines of the display panel 112.

The timing control section 113 generates a sync signal for image display, on the basis of an image sync signal received from the control section 103. The sync signal thus generated is supplied to the signal line drive circuits 116a and 116b.

The timing control section 113 generates various sync signals. Hence, the timing control section 113 has a relatively complicated circuit configuration.

For this reason, a reset signal for resetting voltage accumulated in an internal circuit of the timing control section 113 (i.e., performing initialization) is inputted in the timing control section 113, for example, at activation of the display device 110. This makes it possible to stably generate sync signals in the timing control section 113.

On the basis of sync signals received from the timing control section 113 and image signals received externally, the signal line drive circuits 116a and 116b generate image data to be supplied to pixels arranged on the display panel 112. Then the signal line drive circuits 116a and 116b supply the generated image data to the respective pixels arranged on the display panel 112. In this way, the display device 110 displays a desired image.

CITATION LIST

Patent Literature

Patent Literature 1
Japanese Patent Application Publication, Tokukai, No. 2004-208303 A (Published on Jul. 22, 2004)

SUMMARY OF INVENTION

Technical Problem

In recent years, circuit configurations of the signal line drive circuits 116a and 116b also have been complicated, for example, because a circuit having a timing control function is provided in the signal line drive circuits 116a and 116b.

However, in general, the reset signal is supplied to the timing control section 113 but not to the signal line drive circuits 116a and 116b. Therefore, there is such a problem that the signal line drive circuits 116a and 116b cannot be stably driven.

The reset signal is usually generated by the system main unit 102, and the generated reset signal is supplied to the timing control section 113.

The function of the timing control section 113 and that of the signal line drive circuits 116a and 116b are respectively different. Therefore, a supply voltage with which the timing control section 113 is powered on and supply voltages with which the signal line drive circuits 116a and 116b are powered on have respectively different voltage levels.

Therefore, in a case where reset signal whose voltage level is the same as that of the reset signal supplied to the timing control section 113 is supplied to the signal line drive circuits 116a and 116b, the signal line drive circuits 116a and 116b are damaged or malfunction.

On the other hand, in a case where a power supply voltage having the same voltage level is supplied to drive the timing control section 113 and the signal line drive circuits 116a and 116b so that the reset signal is supplied to both the timing control section 113 and the signal line drive circuits 116a and 116b, the voltage level should be for the timing control section 113, whose resetting requires a higher voltage level than the signal line drive circuits 116a and 116b. However such a voltage level is unnecessarily too high for the signal line drive circuits 116a and 116b, which do not need such a voltage level to be reset. This causes unnecessary power consumption.

The present invention has been made in view of the above problems and an object of the present invention is to achieve an image display with low power consumption and a stable display quality.

Solution to Problem

In order to attain the object, a display device of the present invention is a display device including a sync signal generating section for generating a sync signal for image display operation, a signal line drive section for generating image information for image display operation, a plurality of data signal lines connected to the signal line drive section, and being configured to supply, in response to the sync signal generated by the sync signal generating section, the image information generated to each of the plurality of data signal lines, wherein: one of power supply voltage levels to be supplied to either the sync signal generating section or the signal line drive section is lower than the other power supply voltage level; and the display device includes: a level changing section for changing a voltage level of an externally-supplied reset signal, the reset signal being for initializing internal circuitry of the display device; and the sync signal generating section receiving the externally-supplied reset signal as such, and the signal line drive section receiving the reset signal whose voltage level has been changed by the level changing section.

In order to attain the object, a driving method for the display device of the present invention is a method for driving a display device including a sync signal generating section for generating a sync signal for image display operation, a signal line drive section for generating image information for image display operation, a plurality of data signal lines connected to the signal line drive section, and being configured to supply, in response to the sync signal generated by the sync signal generating section, the image information generated to each of the plurality of data signal lines, the driving method including the steps of: supplying power supply voltages to the sync signal generating section and the signal line drive section, wherein the power supply voltage supplied to the sync signal generating section and the power supply voltage supplied to the signal line drive section are such that one of the power supply voltage supplied to the sync signal generating section and the power supply voltage supplied to the signal line drive section is lower than the other; supplying, to the sync signal, an externally-supplied reset signal for causing an initialized state of an internal circuit(s) of the display device; and changing a voltage level of the externally-supplied reset signal so as to supply, to the signal line drive section, the reset signal whose voltage level has been changed.

According to the configuration, one of power supply voltage levels which is supplied to either the sync signal generating section or the signal line drive section is lower than the other power supply voltage level. This makes it possible to achieve lower power consumption as compared to a case where the same level of power supply voltage is supplied to both the sync signal generating section and the signal line drive section.

Further, the externally-supplied reset signal is supplied to the sync signal generating section. Therefore, the sync signal generating section initializes an accumulated potential in its internal circuit to an initialized state, before generating a sync signal for displaying images. This makes it possible to stably generate a sync signal for displaying images.

Further, the level changing section changes a voltage level of the externally-supplied reset signal, and supplies, to the signal line drive section, the reset signal with the voltage level thus changed.

As such, even in a case where power supply voltage levels to be supplied to the sync signal generating section and the signal line drive section are different from each other, the reset signal can be supplied also to the signal line drive section.

With this configuration, the signal line drive section initializes an accumulated potential in its internal circuit to an initialized state, before generating image information for displaying images. This makes it possible to stably generate image information for displaying images.

This makes it possible to achieve an image display with low power consumption and a stable display quality.

Advantageous Effects of Invention

A display device of the present invention is a display device including a sync signal generating section for generating a sync signal for image display operation, a signal line drive section for generating image information for image display operation, a plurality of data signal lines connected to the signal line drive section, and being configured to supply, in response to the sync signal generated by the sync signal generating section, the image information generated to each of the plurality of data signal lines, wherein: one of power supply voltage levels to be supplied to either the sync signal generating section or the signal line drive section is lower than the other power supply voltage level; and the display device includes: a level changing section for changing a voltage level of an externally-supplied reset signal, the reset signal being for initializing internal circuitry of the display device; and the sync signal generating section receiving the externally-supplied reset signal as such, and the signal line drive section receiving the reset signal whose voltage level has been changed by the level changing section.

A method for driving the display device of the present invention is a method for driving a display device including a sync signal generating section for generating a sync signal for image display operation, a signal line drive section for generating image information for image display operation, a plurality of data signal lines connected to the signal line drive section, and being configured to supply, in response to the sync signal generated by the sync signal generating section, the image information generated to each of the plurality of data signal lines, the driving method including the steps of: supplying power supply voltages to the sync signal generating section and the signal line drive section, wherein the power supply voltage supplied to the sync signal generating section and the power supply voltage supplied to the signal line drive section are such that one of the power supply voltage supplied to the sync signal generating section and the power supply voltage supplied to the signal line drive section is lower than the other; supplying, to the sync signal, an externally-supplied reset signal for causing an initialized state of an internal circuit(s) of the display device; and changing a voltage level of the externally-supplied reset signal so as to supply, to the signal line drive section, the reset signal whose voltage level has been changed.

This brings about an effect of achieving an image display with low power consumption and a stable display quality.

Figure 3:
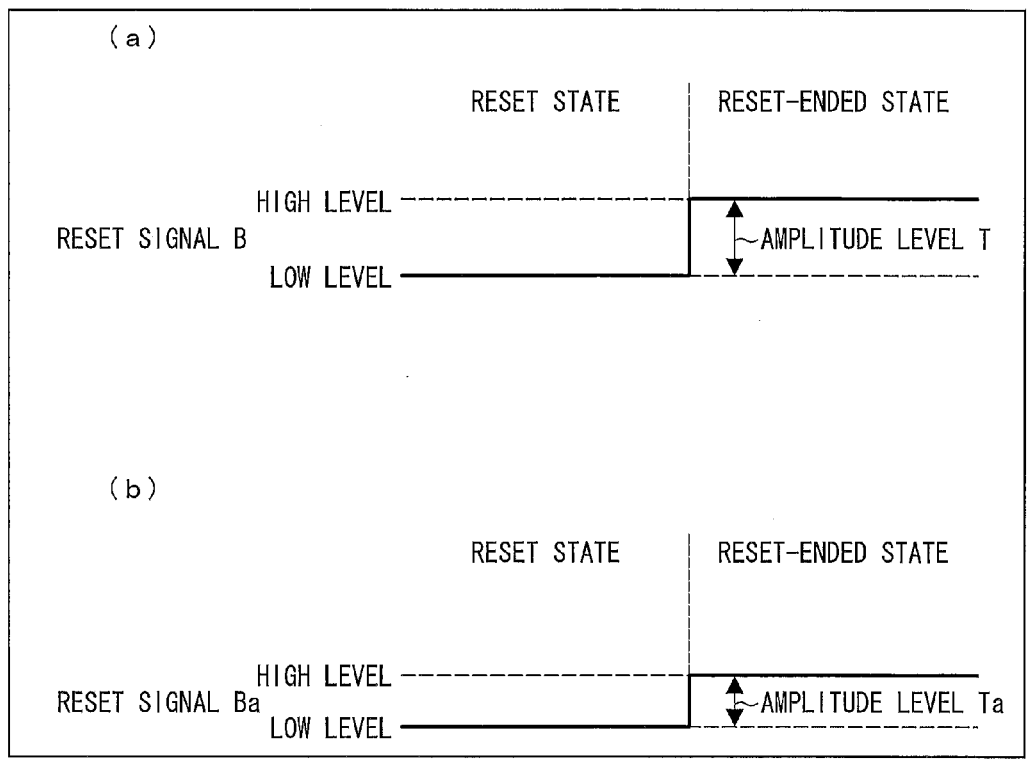

(a) of FIG. 3 is a view illustrating a reset signal. (b) of FIG. 3 is a view illustrating the reset signal after a level change.

Figure 4:
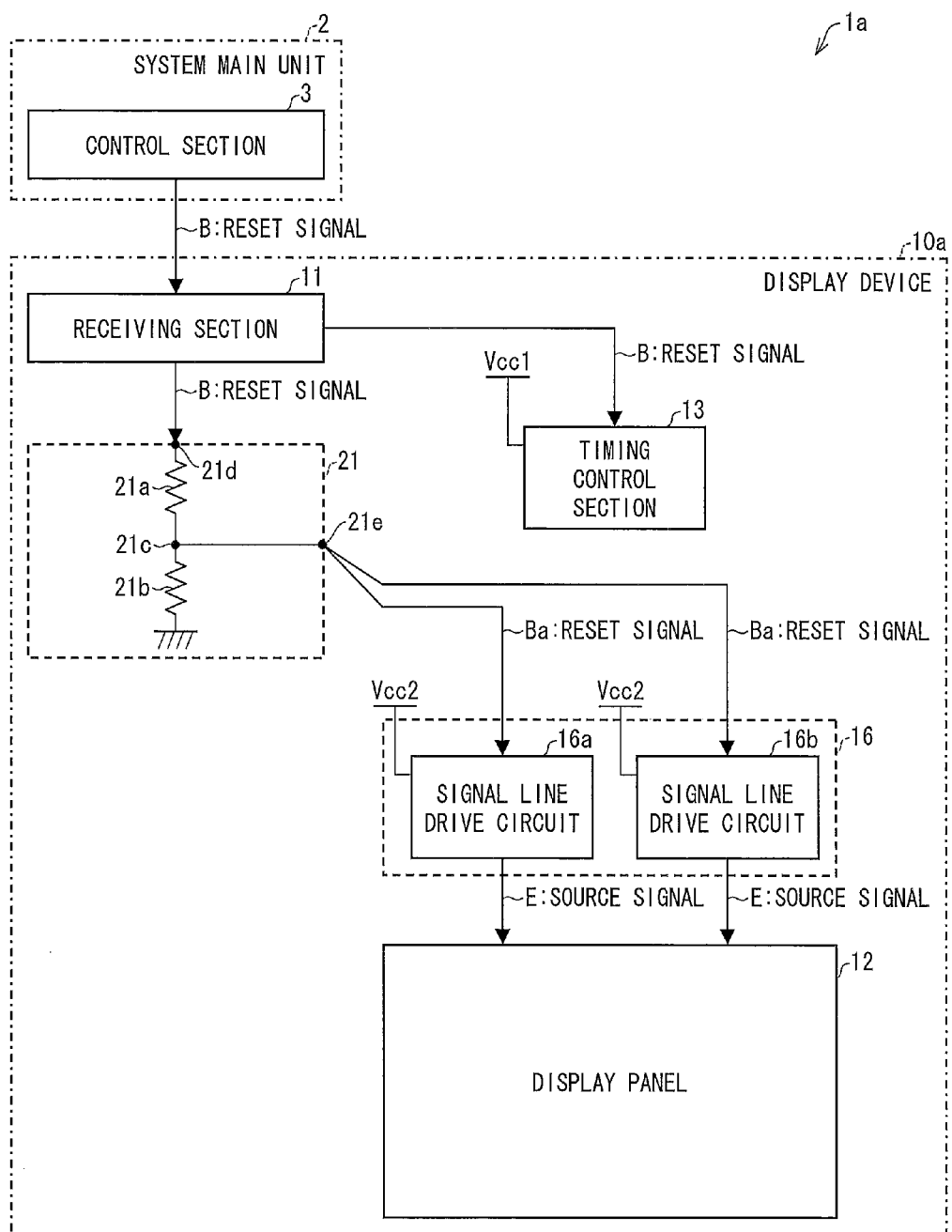

FIG. 4 is a block diagram showing a main configuration of a display device of Embodiment 2.

Figure 5:
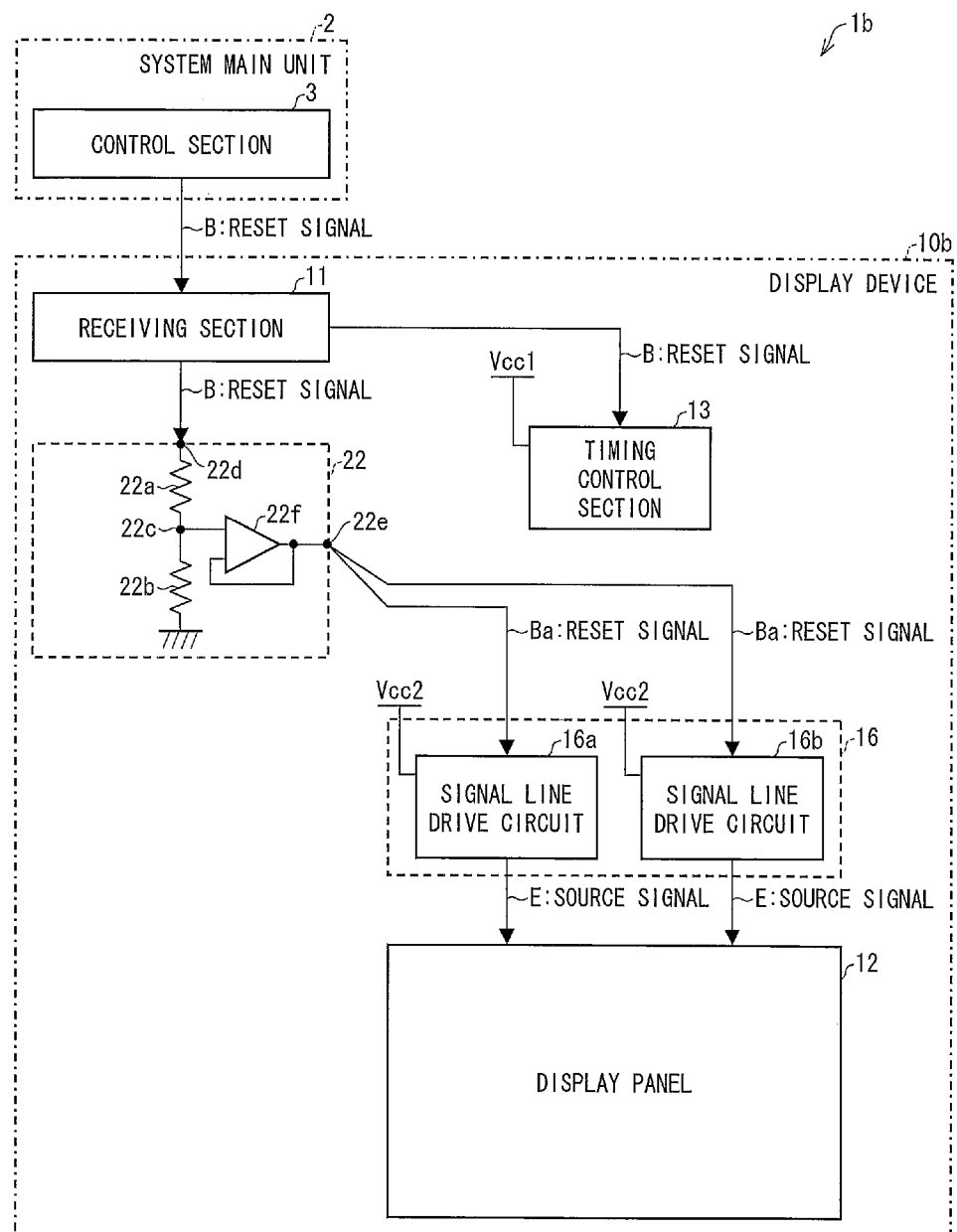

FIG. 5 is a block diagram showing a main configuration of a display device of Embodiment 3.

Figure 6:
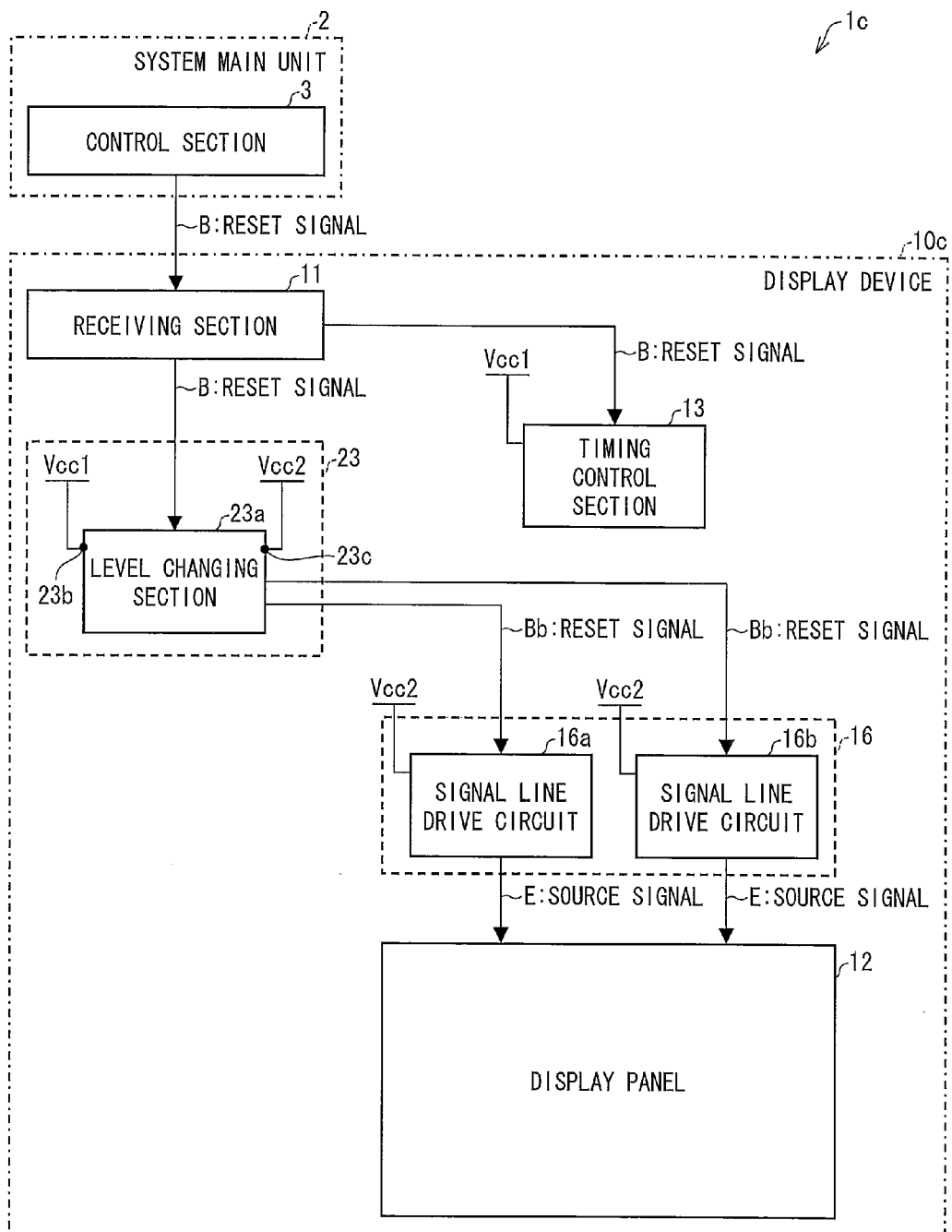

FIG. 6 is a block diagram showing a main configuration of a display device of Embodiment 4.

(a) of FIG. 7 is a view illustrating a reset signal. (b) of FIG. 7 is a view illustrating the reset signal after a level change.

Figure 8:
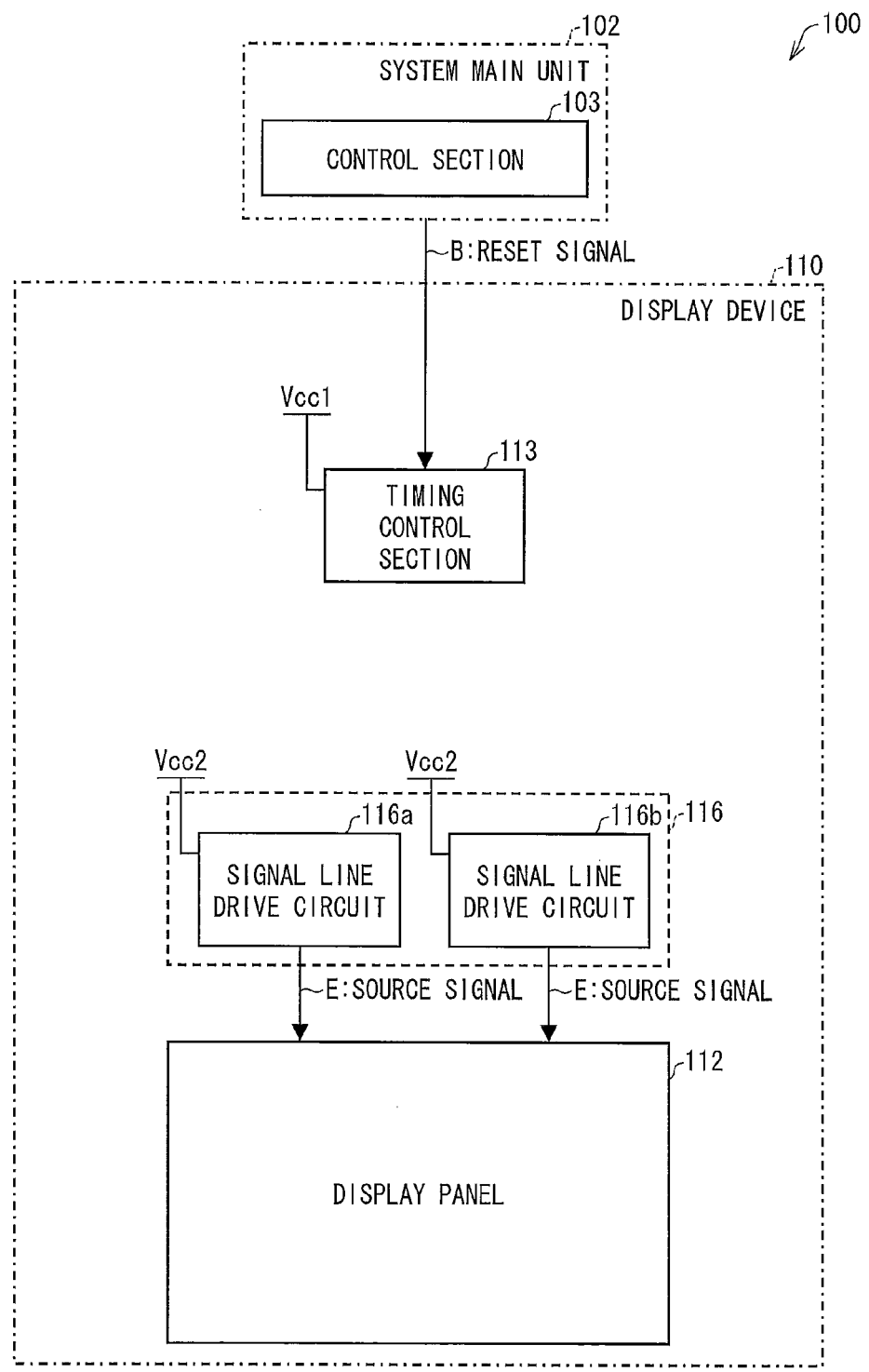

FIG. 8 is a block diagram schematically showing a configuration of a conventional display system.

DESCRIPTION OF EMBODIMENTS

The following description discusses embodiments of the present invention in detail.

Embodiment 1

Overall Configuration of Display Device 10

First, an overall configuration of a display device 10 of Embodiment 1 of the present invention is described with reference to FIG. 1.

Figure 1:
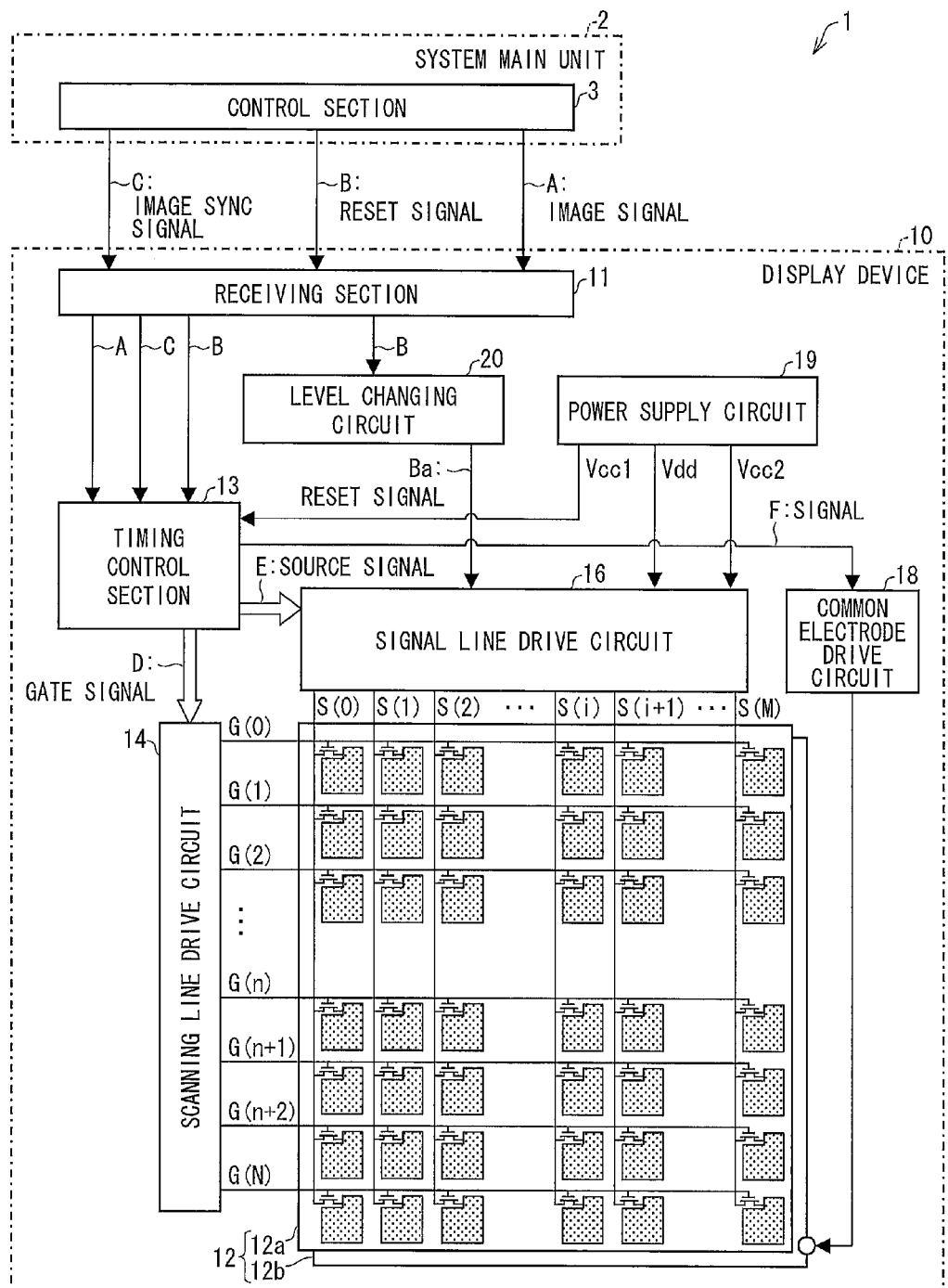
FIG. 1 shows a configuration of a display system including a display device of Embodiment 1.

FIG. 1 is a view showing a configuration of a display system 1 including the display device 10 of the present invention.

As shown in FIG. 1, the display system 1 includes a system main unit 2 and the display device 10 which is connectable with the system main unit 2.

The system main unit 2 includes a control section (control section of the system main unit) 3. The control section 3 supplies, to the display device 10 which is connected with the system main unit 2, various signals for displaying images such as an image signal A, a reset signal B, an image sync signal C and the like.

The display device 10 connected with the system main unit 2 receives, from the control section 3 of the system main unit 2, various signals for displaying images such as the image signal A, the reset signal B, the image sync signal C and the like. The display device 10 then displays images on the basis of the various signals received from the control section 3 of the system main unit 2.

The display system 10 includes a receiving section 11, a display panel 12, a timing control section (sync signal generating section) 13, a scanning line drive circuit (gate driver) 14, a signal line drive circuit (signal line driving section; source driver) 16, a common electrode drive circuit 18, a power supply circuit 19 and a level changing circuit (level changing section) 20.

The display panel 12 includes (i) an active substrate 12a on which a pixel electrode and a switching element (TFT) connected to the pixel electrode are provided in each pixel and (ii) a counter substrate 12b which is arranged to face the active substrate 12a via a liquid crystal layer (not illustrated).

In the present embodiment, the display panel 12 is described as a liquid crystal display panel. However, the display panel 12 is not limited to this. The display panel 12 can be any panel that is capable of displaying images such as an organic electroluminescent (EL) display panel and the like.

In a case where the display panel 12 is a liquid crystal display panel, the display device 10 can be configured as a liquid crystal display device. Further, in a case where the display panel 12 is an EL display panel, the display device 12 can be configured as an electroluminescent display device.

The display panel 12 includes a screen constituted by a plurality of pixels arranged in a matrix manner, an N (N is any integer) number of scanning signal lines G (scanning line; gate lines) for scanning the screen by sequentially being selected line by line, an M (M is any integer) number of data signal lines S (source lines) through which data signals are supplied to a row of pixels corresponding to a selected one of the scanning signal lines.

The scanning signal lines G and the data signal lines S are arranged on the active substrate 12a so as to be orthogonal (intersecting) with each other. Each of the scanning signal lines G is connected with the scanning line drive circuit 14, and each of the scanning signal lines G is thereby scanned sequentially by the scanning line drive circuit 14.

The data signal lines S are connected with the signal line drive circuit 16, and the data signal lines S are thereby scanned sequentially by the signal line drive circuit 16.

G(n) shown in FIG. 1 indicates an n-th (n is any integer) scanning signal line G. For example, G(1), G(2), and G(3) indicate the first, second, and third scanning signal lines G, respectively. S(i) indicates an i-th (i is any integer) data signal line S. For example, S(1), S(2), and S(3) indicate the first, second, and third data signal lines S, respectively.

The receiving section 11 is a connecting section for connecting the display device 10 and the system main unit 2. The receiving section 11 receives the various signals for displaying images supplied from the system main unit 2, and then supplies signals to circuits in the display device 10 on the basis of the signals thus received.

Specifically, the receiving section receives the various signals for displaying images such as the image signal A, the reset signal B, the image sync signal C and the like. Then, the receiving section 11 supplies the image signal A and the image sync signal C to the timing control section 13. Further, the receiving section 11 supplies the reset signal B to the timing control section 13 and the level changing circuit 20.

The reset signal B and a reset signal Ba (described later) are for stabilizing a condition of internal circuits of an LSI that has large scale logic circuits such as the timing control section 13 and the signal line drive circuit 16, etc.

That is, the reset signals B and Ba are command signals for commanding resetting (initializing) potential accumulated in the internal circuits of the timing control section 13 and the signal line drive circuit 16 in the display device 10 at a time when the display device 10 changes its state from a static state to an operating state, for example, at a time when the display device 10 (device) is powered on or immediately after the display device 10 changes its state from a stand-by state to an operating state.

The timing control section 13 generates a gate signal D and a source signal E which are to be respectively supplied to the scanning line drive circuit 14 and the signal line drive circuit 16. The timing control section 13 has a relatively complicated circuit configuration.

As such, in order to generate accurate signals, it is necessary that, when the display device 10 changes its state from the static state to the operating state, the internal circuit of the timing control section 13 be reset prior to generating the gate signal D and the source signal E. Therefore, the reset signal B is supplied to the timing control section 13.

The timing control section 13 receives a reset signal B of a Low (low) level of potential (reset signal B Low) from the receiving section 11. Upon receipt of the reset signal B Low, the timing control section resets (initializes) potential accumulated in its own internal circuit.

On the other hand, upon receipt of a reset signal B of a High (high) level of potential (reset signal B High), the timing control section 13 ends its reset state and generates, on the basis of the image signal A and the image sync signal C (horizontal sync signal, Hsync) supplied from the receiving section 11, sync signals for displaying images. The sync signals function as references for circuits to operate in synchronization with each other.

Then, the timing control section 13 supplies, to the circuits in the display device 10, the sync signals thus generated.

Specifically, the timing control section 13 supplies the gate signal (gate start pulse signal and gate clock signal) D to the scanning line drive circuit 14. Further, the timing control section 13 supplies the source signal (source start pulse signal, source latch strobe signal, and source clock signal) E to the signal line drive circuit 16.

The level changing circuit 20 is a circuit for changing the voltage of an amplitude level (voltage level), which is a potential difference between a Low level (a voltage level indicating a low potential state) and a High level (a voltage level indicating a high potential state) of the reset signal B supplied thereto. Thereby, the level changing circuit 20 generates the reset signal Ba, and supplies, to the signal line drive circuit 16, the reset signal Ba thus generated.

In other words, the voltage level of the reset signal B supplied via the receiving section 11 is changed from a High voltage level to a different voltage level by the level changing circuit 20, which thereby generates the reset signal Ba, and supplies, to the signal line drive circuit 16, the reset signal Ba thus generated.

The level changing circuit 20 can be constituted as, for example, a resistive voltage-dividing circuit including a plurality of resistors provided for dividing voltages supplied thereto. The resistive voltage-dividing circuit can include an amplifier(s). In a case where a driving voltage required to drive the signal line drive circuit 16 is higher than a driving voltage required to drive the timing control section 13, the level changing section 20 can be constituted as a booster circuit.

The reset signals B and Ba will be later described in detail.

The scanning line drive circuit 14 scans, on the basis of the gate signal D received from the timing control section 13, each of the scanning signal lines G sequentially from top to bottom of the screen line by line.

When the scanning signal drive circuit 14 scans a scanning signal line G, the scanning line drive circuit 14 supplies, to the scanning signal line G, a square wave so as to turn on TFTs respectively connected to the pixel electrodes arranged in respective pixels. This causes a row of pixels in the screen to be in a selected state.

Specifically, the scanning line drive circuit 14 starts scanning of the display panel 12 upon receipt of the gate start pulse signal supplied from the timing control section 13, and sequentially applies voltages to each of the scanning signal lines G in accordance with the gate clock signal.

The signal line drive circuit 16 generates image data (image information) for displaying images upon receipt of the source signal E supplied from the timing control section 13, and supply the image data to each pixels.

The signal line drive circuit 16 has, as with the timing control section 13, a relatively complicated circuit configuration by, for example, including a circuit that functions as a timing controller as a part of the signal line drive circuit 16. Therefore, in order to generate accurate signals, it is necessary that, when the display device 10 changes its state from the static state to the operating state, the internal circuit of the signal line drive circuit 16 be reset prior to operate the signal line drive circuit 16. Therefore, the reset signal Ba is supplied to the signal line drive circuit 16.

The signal line drive circuit 16 receives the reset signal Ba of a Low (low) level of potential (reset signal Ba Low) from the level changing circuit when the display device 10 changes its state from a static state to an operating state (for example, the display device 10 is activated by being powered on). Upon receipt of the reset signal Ba Low from the level changing circuit 20, the signal line drive circuit 16 resets (initializes) potential accumulated in its own internal circuit.

Upon receipt of the reset signal Ba of a High (high) level of potential (reset signal Ba High), the signal line drive circuit 16 ends its reset state.

When the reset state is ended, the signal line drive circuit 16 then calculates a voltage level to be supplied to a row of pixels selected by the source signal E, on the basis of the source signal E supplied from the timing control section 13.

Then, the signal line drive circuit 16 supplies a voltage (image information) having the calculated level to each of the data signal lines S. Accordingly, the voltage (image information) is supplied (that is, the image information is written) to each row of pixels corresponding to a selected one of the scanning signal lines G.

Specifically, upon receipt of the source start pulse signal supplied from the timing control section 13, the signal line drive circuit 16 (i) stores, in a register, voltage received for each pixel in accordance with the source clock signal and (ii) supplies the voltage (image information) to each of the data signal lines S on the display panel 12 in accordance with the source latch strobe signal that is subsequently received to thereby supply image data (image information) on each pixel.

Note that the signal line drive circuit 16 can be constituted by a single circuit, or can be constituted by a plurality of signal line drive circuits (described later). Especially, in a case where the display device 10 is used for an electronic device such as a laptop PC that has a relatively large screen and requires high-speed for writing image data on pixels, the signal line drive circuit 16 is preferably constituted by a plurality of a signal line drive circuits.

The power supply circuit 19 is a circuit for generating power supply signals to be supplied to circuits in the display device 10 and supplying the generated power supply signals to the circuits.

The power supply circuit 19 supplies power supply signals (power supply voltages) Vdd and Vcc2 to the signal line drive circuit 16, and a power supply signal (power supply voltage) Vcc1 to the timing control section 13.

In addition to the power supply signals Vdd, Vcc1, and Vcc2, the power supply circuit 19 generates power supply signals Vgh, Vg1, and Vdd2, which are voltage-supplying signals necessary to operate the circuits in the display device 10. The power supply circuit 19 supplies the power supply signals Vgh and Vg1 to the scanning line drive circuit 14, and the power supply signal Vdd2 to the common electrode drive circuit 18.

The display device 10 further includes a common electrode (not illustrated) provided for each pixel in the screen. The common electrode drive circuit 18 supplies, on the basis of a signal F received from the timing control section 13, a predetermined common voltage to the common electrode for driving the common electrode.

For the purpose of reducing power consumption, the display device 10 is configured such that a voltage level (power supply voltage level) of the power supply signal Vcc1 that is to be supplied as a power supply voltage to drive the timing control section 13 is different from a voltage level (power supply voltage level) of the power supply signal Vcc2 that is to be supplied to each of the plurality of signal line drive circuits 16. That is, either one of the voltage levels for driving signal line drive circuits 16a and 16b or the level changing circuit 20 is lower than the other.

For example, an I/O voltage (Input/Output voltage) between the timing control section 13 and the signal line drive circuit 16 is reduced as compared to an I/O voltage between the system main unit 2 and the display device 10. That is, a voltage level of the power supply signal Vcc2 that is to be supplied to the signal line drive circuit 16 is caused to be smaller as compared to a voltage level of the power supply signal Vcc1 that is to be supplied to the timing control section 13.

This makes it possible to achieve reduction in power consumed by the display device 10.

For example, in a case where the display system 1 is constituted by an interface that combines LVDS (Low Voltage Differential Signaling) and SPI (Serial Peripheral Interface), a voltage level for input and output (I/O) between the system main unit 2 and the display device 10 is approximately 3.3 V.

Therefore, setting a voltage level for input and output between the timing control section 13 and the signal line drive circuit 16 at approximately 1.8 V can reduce power consumption to drive the signal line drive circuit 16, thereby achieving reduction in power consumed by the display device 10.

Alternatively, depending on a specification required for the display device 10 such as an interface constituting the display system 1, the power supply signal Vcc1 which is a driving voltage to drive the timing control section 13 can be configured to be lower than the power supply signal Vcc2 which is necessary to drive the signal line drive circuit 16.

This makes it possible to avoid an increase in power consumed to drive the timing control section 13, thereby achieving reduction in power consumed by the display device 10.

(Main Parts of Display Device 10)

Figure 2:
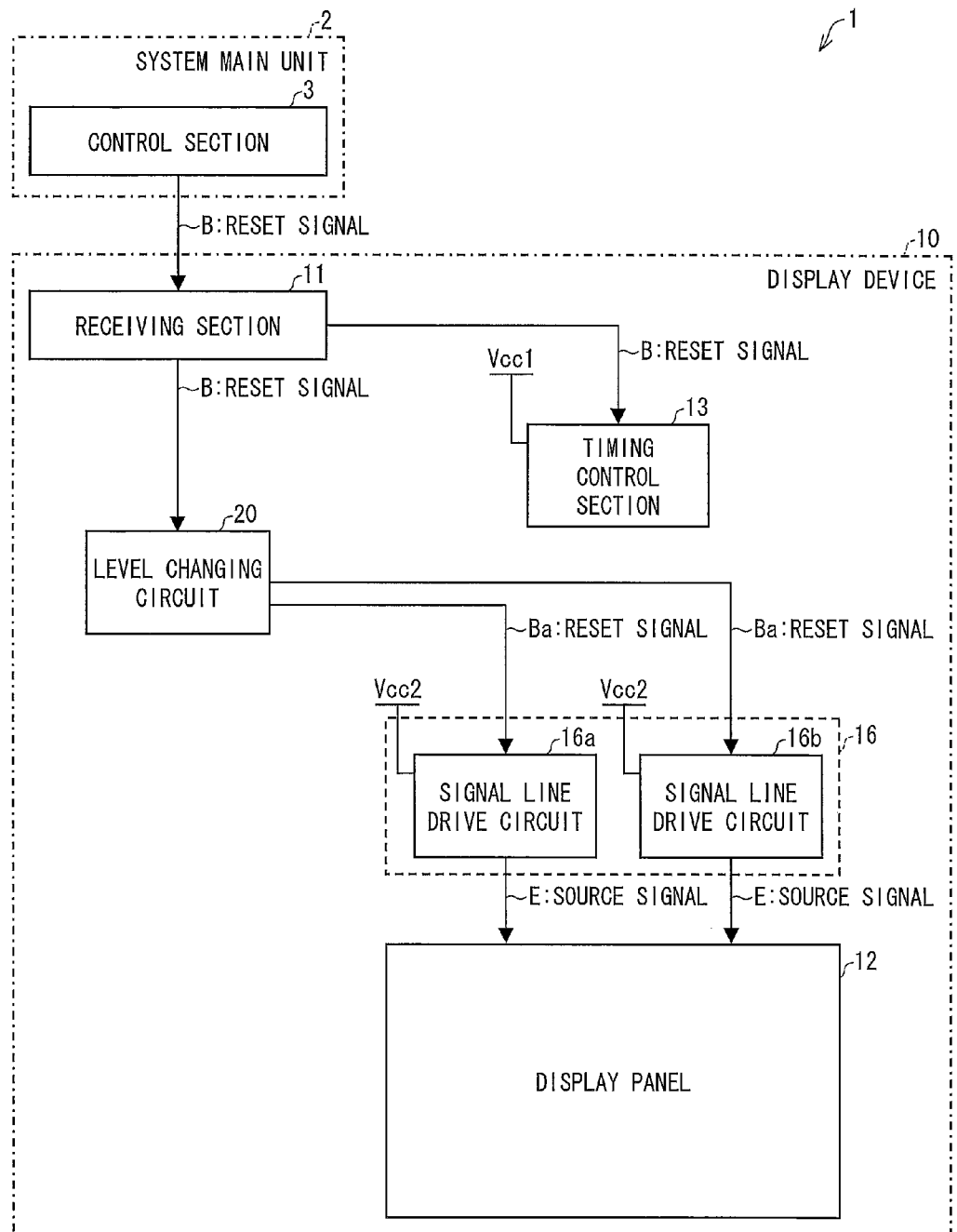
FIG. 2 is a block diagram showing a main configuration of the display device of Embodiment 1.

The following description specifically discusses, with reference to FIG. 2 and (a) and (b) of FIG. 3, a configuration of the main parts of the display device 10. FIG. 2 is a block diagram illustrating the configuration of the main parts of the display device 10.

The signal line drive circuit 16 herein discussed includes two signal line drive circuits, that is, a signal line drive circuit 16a and a signal line drive circuit 16b that are arranged in this order from a place closer to the scanning line drive circuit 14. The signal line drive circuit 16a is connected with the data signal lines S arranged on a half of the screen of the display device 10 which is located closer to the scanning line drive circuit 14, whereas the signal line drive circuit 16b is connected with the data signal lines S arranged on the other half of the screen of the display device 10 which is located farther from the scanning line drive circuit. Each of the signal line drive circuits 16a and 16b are supplied with the power supply signal Vcc2.

As described earlier, for the purpose of reducing power consumed by the display device 10, a voltage level of the power supply signal Vcc1 supplied to the timing control section 13 and a voltage level of the power supply signal Vcc2 supplied to each of the signal line drive circuits 16a and 16b are set to be different so that either of the voltage levels is lower than the other.

The following description discusses, as an example, a case where a voltage level of the power supply signal Vcc2 to be supplied to the signal line drive circuit 16a is smaller than a voltage level of the power supply signal Vcc1 to be supplied to the timing control section 13.

Upon receipt of the reset signal B from the control section 3, the receiving section 11 supplies the reset signal B to the timing control section 13 as well as to the level changing circuit 20.

(a) of FIG. 3 is a view showing the reset signal B. (b) of FIG. 3 is a view showing the reset signal B that after a level change.

A reset signal B Low commanding the timing control section 13 to become in a reset state is supplied to the timing control section 13 immediately after the display device 10 is powered on or at a time when the display device 10 changes its state from a stand-by state to an operating state. Upon receipt of the reset signal B Low, the timing control section 13 becomes in a reset state in which voltage accumulated in its internal circuit is discharged, so as to reset the internal circuit.

On the other hand, upon receipt of a reset signal B High, the timing control section 13 ends its reset state, and generates, on the basis of the image sync signal C, (i) the source signal E so as to supply the same to the signal line drive circuits 16a and 16b and (ii) the gate signal D so as to supply the same to the scanning line drive circuit 14.

On the other hand, the signal line drive circuits 16a and 16b receive, from the level changing section 20, the reset signal Ba that had a level change so as to have a smaller amplitude level than an amplitude level of a level signal B.

An amplitude level T is greater than (>) an amplitude level Ta, where the amplitude level (voltage level) T is a potential difference between the Low level and the High level of the reset signal B, and the amplitude level (voltage level) Ta is a potential difference between the Low level and the High level of the reset signal Ba.

When the signal line drive circuits 16a and 16b require resetting, such as immediately after the display device 10 is powered on or at a time when the display device 10 changes its state from a stand-by state to an operating state, a reset signal Ba Low commanding the signal line drive circuits 16a and 16b to become in a reset state is supplied from the level changing circuit 20 to the signal line drive circuits 16a and 16b.

Upon receipt of the reset signal Ba Low, the signal line drive circuits 16a and 16b become in a reset state in which potential accumulated in their internal circuit is reset.

Subsequently, a reset signal B High commanding the signal line drive circuits 16a and 16b to end their reset state is supplied from the receiving section 11 to the level changing circuit 20.

Note however, that the driving voltage (that is, the power supply signal Vcc2) to drive the signal line drive circuits 16a and 16b is smaller than the driving voltage (that is, the power supply voltage Vcc1) to drive the timing control section 13, as described earlier.

That is, the signal line drive circuits 16a and 16b have a circuit configuration by which they are driven with a lower voltage than a voltage required to drive the timing control section 13. Therefore, if a voltage of the reset signal B High is supplied to the signal line drive circuits 16a and 16b, there is such a failure that the circuits of the signal line drive circuits 16a and 16b are damaged.

For this reason, the level changing circuit 20 generates the reset signal Ba by lowering the voltage of the reset signal B High. The level changing circuit 20 supplies the reset signal Ba thus generated to the signal line drive circuits 16a and 16b.

Upon receipt of the reset signal Ba High, the signal line drive circuits 16a and 16b end their reset state. Thereafter, the signal line drive circuits 16a and 16b supply voltage to the data signal lines S on the basis of the source signal E supplied from the timing control section 13, so as to supply image data to each pixel.

In this way, the display device 10 can supply the reset signal Ba also to the signal line drive circuit 16, even in a case where power supply voltage levels supplied to the timing control section 13 and the signal line drive circuit 16 are different to be the Vcc1 and the Vcc2, respectively.

With this configuration, when the display device 10 changes its state from a static state to an operating state, the signal line drive sections 16a and 16b initialize potential accumulated in their internal circuits, and then generate image data to be supplied to the data signal lines S. This makes it possible to stably generate the image data.

This makes it possible to achieve the display device 10 and the display system 1 which are low in power consumption and capable of displaying images with a stable display quality.

Note here that, in a case where the display panel 12 is a display panel with a relatively small screen size (for example, approximately Class type 7 or smaller, especially Class type 3 or smaller), the signal line drive circuit 16 can be constituted by a single circuit. Further, in a case where the signal line drive circuit 16 is constituted by a single circuit, the level changing circuit 20 can be provided in the signal line drive circuit 16 such that the level changing section 20 and the signal line drive circuit 16 can be integrated into one chip.

Integration of the level changing circuit 20 and the signal line drive circuit 16 into one chip can save a circuit installation space. This makes it possible for the display device 10 to be provided in electronic devices such as mobile phones in which reduction in the circuit installation space is strongly demanded.

On the other hand, in a case where the display panel 12 is a display panel with a relatively large screen size (for example, Class type 4 or larger, especially Class type 8 or larger), and the display device 10 is used for an electronic device in which high speed to write image data on each pixel is strongly demanded, the display device 10 preferably includes two signal line drive circuits, that is, the signal line drive circuits 16a and 16b as shown in FIG. 2.

However, in a case where the display panel 12 with a relatively large screen size (not less than Class type 4 and not more than Class type 7 or Class type 8 or larger, as one example) is used, a pixel size becomes bigger. Accordingly, power consumed by the display panel 12 and the peripheral circuits increase. For this reason, in a case where the display panel 12 with a relatively large screen size is used, reduction in power consumed by the display device 10 is especially demanded.

Since the display device 10 includes the signal line drive circuits 16a and 16b which are independent with each other, the signal line drive circuit 16a supplies, via the data signal lines S connected thereto, and the signal line drive circuit 16b supplies, via the data signal lines S connected thereto, image data to each pixel arranged on the screen.

This makes it possible to supply image data in a short time from the signal line drive circuits 16a and 16b to each pixel, thereby achieving an image display with a stable display quality.

Further, as described earlier, the display device 10 is configured such that one of power supply voltage levels, which is either a power supply voltage level of the power supply signal Vcc1 to be supplied to the timing control section 13 or a power supply voltage level of the power supply signal Vcc2 to be supplied to the signal line drive circuits 16a and 16b, is lower than the other power supply voltage level. Therefore, even in a case where a screen size of the display panel 12 is as large as Class type 4 or larger, especially Class type 8 or larger in which the signal line drive circuits 16a and 16b are provided, an increase of power consumption can be suppressed. Therefore, using the display device 10 for an electronic device such as a laptop PC with a relatively large screen size and with a strong demand for high speed to write image data on each pixel makes it possible to achieve an electronic device with a high speed for writing image data and with low power consumption.

Further, in a case where two signal line drive circuits, that is, the signal line drive circuits 16a and 16b, are provided, it is preferable that the level changing circuit 20 is provided external to the signal line drive circuits 16a and 16b as having a configuration independent from the signal line drive circuits 16a and 16b so that the level changing circuit 20 is not provided to each of the scanning signal line drive circuits 16a and 16b. This makes it possible to supply the reset signal Ba to each of the two signal line drive circuits, that is, the signal line drive circuits 16a and 16b, without providing the level changing circuit 20 in plurality. Therefore, it is possible to prevent the signal line drive circuits 16a and 16b from having a complicated circuit configuration and an increased circuit installation space.

Embodiment 2

Next, a configuration of a display device 10a in accordance with Embodiment 2 of the present invention is described with reference to FIG. 4. Note that, for convenience of description, members having the same functions as those illustrated in the drawings of the preceding Embodiment 1 are given the same reference numbers and their explanations are omitted.

FIG. 4 is a block diagram illustrating a configuration of the main parts of a display device 10a. A display system 1a is different from the display system 1 in that the display system 1a has a display device 10 connected to a system main unit 2 in place of the display device 10.

The display device 10a is different from the display device 10 in that the display device 10a includes a resistive voltage-dividing circuit (level changing section) 21 in place of the level changing circuit 20 that was included in the display device 10. The other configurations of the display device 10a are the same as those of the display device 10.

The resistive voltage-dividing circuit 21 is a voltage drop circuit for lowering a voltage level of a reset signal B supplied from a receiving section 11 so as to generate a reset signal Ba, and supplying the reset signal Ba to each of signal line drive circuits 16a and 16b.

The resistive voltage-dividing circuit 21 is configured in such a manner that a resistor 21a and a resistor 21b are connected with each other in series. One end of the resistor 21a is an input terminal 21d of the resistive voltage-dividing circuit 21. The other end of the resistor 21a and one end of the resistor 21 is connected with each other at a connecting point 21c. The connecting point 21c and an output terminal 21e of the resistive voltage-dividing circuit 21 are connected with each other, and the output terminal 21e has the same potential as that at the connecting point 21c. The other end of the resistor 21b is grounded.

The input terminal 21d of the resistive voltage-dividing circuit 21 is connected to the receiving section 11. Upon receipt of the reset signal B from the receiving section 11, the resistive voltage-dividing circuit 21 divides voltage of the reset signal B with use of the resistors 21a and 21b so as to generate the reset signal Ba, which is the reset signal B with a dropped voltage. The reset signal Ba thus generated is supplied from the connecting point 21c to each of the signal line drive circuits 16a and 16b via the output terminal 21e.

As described above, the resistive voltage-dividing circuit 21 is a voltage dividing circuit for dividing a voltage level of the reset signal B High supplied from the receiving section 11 with use of only two resistors so as to reduce an amplitude level T of the reset signal B, to thereby generate the reset signal Ba whose amplitude level is Ta.

As has been described, since the resistive voltage-dividing circuit 21 has a simple circuit configuration, it is possible to suppress a cost increase caused by providing the resistive voltage-dividing circuit 21. Especially, since the resistive voltage-dividing circuit 21 can generate the reset signal Ba by dividing a voltage with use of the two resistors 21a and 21b, almost no cost increase is necessary.

Note that, what is required for the resistive voltage-dividing circuit 21 is to generate the reset signal Ba by dividing voltage of the reset signal B supplied. Therefore, the resistive voltage-dividing circuit 21 can be constituted by three or more resistors.

Embodiment 3

Next, a configuration of a display device 10b in accordance with Embodiment 3 of the present invention is described with reference to FIG. 5. Note that, for convenience of description, members having the same functions as those illustrated in the drawings of the preceding Embodiments 1 and 2 are given the same reference numbers and their explanations are omitted.

FIG. 5 is a block diagram illustrating a configuration of the main parts of the display device 10b. A display system 1b is different from the display systems 1 and 1a in that the display system 1b has a display device 10b connected to a system main unit 2 in place of the display devices 10 and 10a.

The display device 10b is different from the display devices 10 and 10a in that the display device 10b includes a resistive voltage-dividing circuit (level changing section) 22 in place of the level changing circuit 20 that was included in the display device 10, and the resistive voltage-dividing circuit 21 that was included in the display device 10a. The other configurations of the display device 10b are the same as those of the display devices 10 and 10a.

The resistive voltage-dividing circuit 22 is a voltage drop circuit for lowering a voltage level of a reset signal B supplied from a receiving section 11 so as to generate a reset signal Ba, and supplying the reset signal Ba to each of signal line drive circuits 16a and 16b.

The resistive voltage-dividing circuit 22 includes resistors 22a and 22b, a connecting point 22c, an input terminal 22d, and an output terminal 22e that respectively correspond to the resistors 21a and 21b, the connecting point 21c, the input terminal 21d, and the output terminal 21e that were included in the resistive voltage-dividing circuit 21.

Further, the resistive voltage-dividing circuit 22 includes an amplifier circuit 22f whose input terminal is connected to the connecting point 22c and whose output terminal is connected to the output terminal 22e.

That is, the amplifier circuit 22f is arranged so as to be connected to the connecting point 22c which is an output terminal of voltage dividing circuits, namely the resistors 22a and 22b Upon receipt of the reset signal B from a receiving section 11, the resistive voltage-dividing circuit 22 divides a voltage of the reset signal B with use of the resistors 22a and 22b so as to generate a reset signal Ba. The reset signal Ba thus generated is supplied from the output terminal 22e to each of the signal line drive circuits 16a and 16b via the amplifier circuit 22f.

The amplifier circuit 22f can stabilize the reset signal Ba supplied from voltage dividing circuits namely the resistors 22a and 22b. With this configuration, the resistive voltage-dividing circuit 22 can achieve the display device 10b that is capable of displaying images with a stable display quality.

Embodiment 4

Next, a configuration of a display device 10c in accordance with Embodiment 4 of the present invention is described with reference to FIGS. 6 and 7. Note that, for convenience of description, members having the same functions as those illustrated in the drawings of the preceding Embodiments 1 through 3 are given the same reference numbers and their explanations are omitted.

FIG. 6 is a block diagram illustrating a configuration of the main parts of the display device 10c. A display system 1c is different from the display systems 1, 1a, and 1b in that the display system 1c has a display device 10c connected to a system main unit 2 in place of the display devices 10, 10a, and 10b.

The display device 10c is different from the display devices 10, 10a, and 10b in that the display device 10c includes a level changing circuit (level changing section) 23 in place of the level changing circuit 20 that was included in the display device 10 and the resistive voltage-dividing circuits 21 and 22 that were respectively included in the display devices 10a and 10b.

Further, in the present embodiment, a voltage level of a power supply signal Vcc2 is greater than a voltage level of a power supply signal Vcc1 (Vcc1 < Vcc2).

That is, the display device 10c is configured such that the voltage level of the power supply signal Vcc1 supplied to a timing control section 13 is smaller than the voltage level of the power supply signal Vcc2 supplied to each of signal line drive circuits 16a and 16b.

This makes it possible to (i) supply, to the signal line drive circuits 16a and 16b, a voltage required to drive the signal line drive circuits 16a and 16b, and (ii) drive the timing control section 13 with a lower voltage level as compared to the voltage required to drive the signal line drive circuits 16a and 16b. This makes it possible to achieve reduction in power consumption.

The level changing circuit 23 is a voltage booster circuit for increasing a voltage level of a reset signal B supplied thereto so as to generate a reset signal Ba, and supplying the reset signal Ba to each of the signal line drive circuits 16a and 16b.

The level changing circuit 23 includes a level changing IC 23a. The level changing IC 23a receives the power supply signal Vcc1 through a power supply input terminal 23b which is on a signal receiving side, whereas the level changing IC 23a receives the power supply signal Vcc2 through a power supply input terminal 23c which is on a signal supplying side.

The level changing circuit 23 increases, upon receipt of the reset signal B from a receiving section 11, an amplitude level T of the reset signal B to an amplitude level Tb with use of the level changing IC 23c so as to generate a reset signal Bb.

(a) of FIG. 7 is a view showing the reset signal B. (b) of FIG. 7 is a view showing the reset signal Bb that has an increased amplitude level.

The level changing circuit 23 then supplies the reset signal Bb thus generated to the signal line drive circuits 16a and 16b.

As has been described, the level changing circuit 23 includes the level changing IC 23a for increasing the amplitude level T of the supplied reset signal B so as to supply the rest signal with an increased amplitude level T to the signal line drive circuits 16a and 16b.

In this way, even in a case where a voltage level of the power supply signal Vcc2 to be supplied to the signal line drive circuits 16a and 16b is higher than a voltage level of the power supply signal Vcc1 to be supplied to the timing control section 13, the level changing circuit 23 can increase the amplitude level T of the reset signal B so as to generate the reset signal Ba and supply the reset signal Bb thus generated to the signal line drive circuits 16a and 16b.

This makes it possible to also supply the reset signal Bb to the signal line drive circuits 16a and 16b while a voltage level required to drive the signal line drive circuits 16a and 16b is supplied to the signal line drive circuits 16a and 16b. Therefore, it is possible to drive the timing control section 13 with reduced voltage consumption and stably drive the signal line drive circuits 16a and 16b.

The present invention is not limited to the descriptions of the respective embodiments, but may be altered within the scope of the claims. An embodiment derived from a proper combination of technical means disclosed in different embodiments is encompassed in the technical scope of the invention.

As has been described, a display device of the present invention is a display device including a sync signal generating section for generating a sync signal for image display operation, a signal line drive section for generating image information for image display operation, a plurality of data signal lines connected to the signal line drive section, and being configured to supply, in response to the sync signal generated by the sync signal generating section, the image information generated to each of the plurality of data signal lines, wherein: one of power supply voltage levels to be supplied to either the sync signal generating section or the signal line drive section is lower than the other power supply voltage level; and the display device includes: a level changing section for changing a voltage level of an externally-supplied reset signal, the reset signal being for initializing internal circuitry of the display device; and the sync signal generating section receiving the externally-supplied reset signal as such, and the signal line drive section receiving the reset signal whose voltage level has been changed by the level changing section.

In order to attain the object, a method for driving a display device including a sync signal generating section for generating a sync signal for image display operation, a signal line drive section for generating image information for image display operation, a plurality of data signal lines connected to the signal line drive section, and being configured to supply, in response to the sync signal generated by the sync signal generating section, the image information generated to each of the plurality of data signal lines, the driving method including the steps of: supplying power supply voltages to the sync signal generating section and the signal line drive section, wherein the power supply voltage supplied to the sync signal generating section and the power supply voltage supplied to the signal line drive section are such that one of the power supply voltage supplied to the sync signal generating section and the power supply voltage supplied to the signal line drive section is lower than the other; supplying, to the sync signal, an externally-supplied reset signal for causing an initialized state of an internal circuit(s) of the display device; and changing a voltage level of the externally-supplied reset signal so as to supply, to the signal line drive section, the reset signal whose voltage level has been changed.

According to the configuration, one of power supply voltage levels which is supplied to either the sync signal generating section or the signal line drive section is lower than the other power supply voltage level. This makes it possible to achieve lower power consumption as compared to a case where the same level of power supply voltage is supplied to both the sync signal generating section and the signal line drive section.

Further, the externally-supplied reset signal is supplied to the sync signal generating section. Therefore, the sync signal generating section initializes an accumulated potential in its internal circuit to an initialized state, before generating a sync signal for displaying images. This makes it possible to stably generate a sync signal for displaying images.

Further, the level changing section changes a voltage level of the externally-supplied reset signal, and supplies, to the signal line drive section, the reset signal with the voltage level thus changed.

As such, even in a case where power supply voltage levels to be supplied to the sync signal generating section and the signal line drive section are different from each other, the reset signal can be supplied also to the signal line drive section.

With this configuration, the signal line drive section initializes an accumulated potential in its internal circuit to an initialized state, before generating image information for displaying images. This makes it possible to stably generate image information for displaying images.

This makes it possible to achieve an image display with low power consumption and a stable display quality.

It is preferable that a power supply voltage level to be supplied to the signal line drive section is lower than a power supply voltage level to be supplied to the sync signal generating section.

According to the configuration, the signal line drive section is driven with a lower voltage level as compared to that required to drive the sync signal generating section. This makes it possible to achieve reduction in power consumption.

Further, it is preferable that the level changing section is constituted by a circuit that reduces the voltage level of the supplied reset signal so as to supply the reset signal with a reduced voltage to the signal line drive section.

According to the configuration, even in a case where a power supply voltage level to be supplied to the signal line drive section is lower than a power supply voltage level to be supplied to the sync signal generating section, the level changing circuit supplies the reset signal to the signal line drive circuit. This makes it possible to achieve reduction in power consumption and stably drive the signal line drive circuit.

Note that it can be configured that a power supply voltage level to be supplied to the sync signal generating section is lower than a power supply voltage level to be supplied to the signal line drive section.

According to the configuration, the sync signal generating section is driven with a lower voltage level as compared to that required to drive the signal line drive section. This makes it possible to achieve reduction in power consumption.

Further, it can be configured that the level changing section is constituted by a circuit that increases the voltage level of the supplied reset signal so as to supply the reset signal with an increased voltage level to the signal line drive section. According to the configuration, even in a case where a power supply voltage level to be supplied to the signal line drive section is higher than a power supply voltage level to be supplied to the sync signal generating section, the level changing circuit can increase the voltage level of the reset signal so as to supply the reset signal with an increased voltage level to the signal line drive circuit.

This makes it possible to also supply the reset signal to the signal line drive section while a power supply voltage level required to drive the signal line drive section is supplied to the signal line drive section. This makes it possible to drive the sync signal generating section with low power consumption, and stably drive the signal line drive circuit.

Further, it is preferable that the signal line drive section is constituted by a plurality of signal line drive sections which are independent with each other, and each of the plurality of signal line drive sections is connected to corresponding ones of the plurality of data signal lines arranged on a screen.

According to the configuration, the plurality of signal line drive sections supply image information to each pixel arranged on the screen via the data signal lines connected to each of the signal line drive sections. With this configuration, the plurality of signal line drive sections can supply the image information to the each pixel in a short time, thereby achieving a display device which is capable of displaying image with a stable display quality.

Further, according to the configuration, a power supply voltage to be supplied to the sync signal generating section and a power supply voltage to be supplied to the signal line drive section are such that one of the power supply voltage supplied to the sync signal generating section and the power supply voltage supplied to the signal line drive section is lower than the other. Accordingly, even in a case where a display panel is as large as a screen size in which the plurality of signal line drive circuits are provided, it is possible to suppress an increase of power consumption.

Furthermore, it is preferable that the level changing section is provided external to each of the plurality of signal line drive sections. According to the configuration, a single level changing section can supply, to a plurality of signal line drive sections, a reset signal that had a level change. This makes it possible to prevent a circuit configuration of the signal line drive circuits from being complicated.

Further, it is preferable that the circuit constituting the level changing section is a voltage dividing circuit that includes a plurality of resistors and performs voltage dividing of the supplied reset signal with use of the plurality of resistors so as to reduce the voltage level of the supplied reset signal.

According to the configuration, the level changing section has a simple circuit configuration. Hence, it is possible to suppress a cost increase caused by providing a level changing section.

Further, it can be preferably configured that the voltage dividing circuit includes an amplifier circuit connected with output terminals of the plurality of resistors. This configuration can stabilize output from the voltage dividing circuit. This makes it possible to achieve a display device that is capable of displaying images with a stable display quality.

The display device can be a liquid crystal display by including a display panel, the display panel being a liquid crystal display panel. This makes it possible to obtain a liquid crystal display device.

Alternatively, the display panel can be an organic electroluminescent display panel. This makes it possible to obtain an electroluminescent display device.

INDUSTRIAL APPLICABILITY

The present invention is applicable to display devices required to perform an image display with low power consumption and a driving method of the same.

REFERENCE SIGNS LIST 1, 1a, and 1b Display System
2 System Main Unit
3 Control Section
10, 10a, and 10b Display Device
13 Timing control section (Sync signal Generating Section)
14 Scanning Line Drive Circuit
16, 16a, and 16b Signal Line Drive Circuit (Signal Line Drive Section)
19 Power Supply Circuit
20 Level Changing Circuit (Level Changing Section)
21 and 22 Resistive voltage-dividing Circuit (Level Changing Section)
21a and 21b Resistors
22f Amplifier circuit
B, Ba, and Bb Reset Signals
S Data Signal Lines
T, Ta, and Tb Amplitude Levels
Vcc1 and Vcc2 Power Supply Signals

The invention claimed is:

1. A display device including a timing controller circuit generating a sync signal for image display operation, a signal line drive circuit generating image information for image display operation, a plurality of data signal lines connected to the signal line drive circuit, and supplying, in response to the sync signal generated by the timing controller circuit, the image information generated to each of the plurality of data signal lines, wherein
one of power supply voltage levels to be supplied to either the timing controller circuit or the signal line drive circuit is lower than the other-power supply voltage level; and
the display device comprises:
a level changing circuit changing a voltage level of an externally supplied reset signal, the reset signal being for initializing internal circuitry of the display device;
the timing controller circuit receiving the externally supplied reset signal as such, and the signal line drive circuit receiving the reset signal whose voltage level has been changed by the level changing circuit;
a power supply voltage level to be supplied to the signal line drive circuit is lower than a power supply voltage level to be supplied to the timing controller circuit; and
the level changing circuit reduces the voltage level of the supplied reset signal so as to supply the reset signal with a reduced voltage to the signal line drive circuit.

2. The display device according to claim 1, wherein:
the signal line drive circuit is defined by a plurality of signal line drive circuit sections which are independent with each other, and
each of the plurality of signal line drive circuit sections is connected to corresponding ones of the plurality of data signal lines arranged on a screen.

3. The display device according to claim 2, wherein the level changing circuit is provided external to each of the plurality of signal line drive circuit sections.

4. The display device according to claim 1, wherein the level changing circuit is a voltage dividing circuit that includes a plurality of resistors and performs voltage dividing of the supplied reset signal with use of the plurality of resistors so as to reduce the voltage level of the supplied reset signal.

5. The display device according to claim 4, wherein the voltage dividing circuit includes an amplifier circuit connected with output terminals of the plurality of resistors.

6. The display device according to claim 1 being a liquid crystal display device by including a display panel, the display panel being a liquid crystal display panel.

7. The display device according to claim 1 being an organic electroluminescent display device by including a display panel, the display panel being an organic electroluminescent display panel.

8. A display device including a timing controller circuit generating a sync signal for image display operation, a signal line drive circuit generating image information for image display operation, a plurality of data signal lines connected to the signal line drive circuit, and supplying, in response to the sync signal generated by the timing controller circuit, the image information generated to each of the plurality of data signal lines, wherein
one of power supply voltage levels to be supplied to either the timing controller circuit or the signal line drive circuit is lower than the other power supply voltage level; and
the display device comprises:
a level changing circuit for changing a voltage level of an externally supplied reset signal, the reset signal being for initializing internal circuitry of the display device;
the timing controller circuit receiving the externally supplied reset signal as such, and the signal line drive circuit receiving the reset signal whose voltage level has been changed by the level changing circuit;
a power supply voltage level to be supplied to the timing controller circuit is lower than a power supply voltage level to be supplied to the signal line-drive circuit; and
the level changing a circuit increases the voltage level of the supplied reset signal so as to supply the reset signal with an increased voltage level to the signal line drive circuit.

9. The display device according to claim 8, wherein:
the signal line drive circuit includes a plurality of signal line drive circuit sections which are independent with each other, and each of the plurality of signal line drive circuit sections is connected to corresponding ones of the plurality of data signal lines arranged on a screen.

10. The display device according to claim 9, wherein the level changing circuit is provided external to each of the plurality of signal line drive circuits.

11. The display device according to claim 8 being a liquid crystal display device by including a display panel, the display panel being a liquid crystal display panel.

12. The display device according to claim 8 being an organic electroluminescent display device by including a display panel, the display panel being an organic electroluminescent display panel.

13. A method for driving a display device including a timing controller circuit generating a sync signal for image display operation, a signal line drive circuit generating image information for image display operation, a plurality of data signal lines connected to the signal line drive circuit, and being configured to supply, in response to the sync signal generated by the timing controller circuit, the image information generated to each of the plurality of data signal lines, the driving method comprising the steps of:

supplying power supply voltages to the timing controller circuit and the signal line drive circuit, wherein the power supply voltage supplied to-the timing controller circuit and the power supply voltage supplied to the signal line drive circuit are such that one of the power supply voltage-supplied to the timing controller circuit and the power supply-voltage supplied to the signal line drive circuit is lower than the other;

supplying, to the timing controller, an externally-supplied reset signal for causing an initialized state of an internal circuit(s) of the display device; and changing a voltage level of the externally-supplied reset signal so as to supply, to the signal line drive circuit, the reset signal whose voltage level has been changed; wherein a power supply voltage level to be supplied to the signal line drive circuit is lower than a power supply voltage level to be supplied to the timing controller circuit; and the level changing circuit reduces the voltage level of the supplied reset signal so as to supply the reset signal with a reduced voltage to the signal line drive circuit.

\* \* \* \* \*